US005890165A

United States Patent [19]

Boudrie et al.

[11] Patent Number: 5,890,165

[45] Date of Patent: Mar. 30, 1999

[54] METHOD AND APPARATUS FOR AUTOMATIC DISCOVERY OF DATABASES

[75] Inventors: Robert A. Boudrie, Natick; Madhav G. Mutalik, Northboro, both of Mass.

[73] Assignee: EMC Corporation, Hopkinton, Mass.

[21] Appl. No.: 625,014

[22] Filed: Mar. 29, 1996

[51] Int. Cl.[6] .................................................. G06F 17/30

[52] U.S. Cl. ............... 707/202; 395/182.18; 395/200.64; 707/204; 707/205

[58] Field of Search ........................ 395/67, 500, 182.18, 395/200.64, 202, 204, 205; 364/282.1, 182.04, 283.1, 222.81, 222.82, 283.4, 268.2; 707/1, 10, 101, 204, 200, 201, 205

[56] References Cited

U.S. PATENT DOCUMENTS

| | | | |
|---|---|---|---|
| 4,714,995 | 12/1987 | Hatana et al. | 364/200 |
| 5,109,515 | 4/1992 | Laggis et al. | 395/725 |
| 5,185,860 | 2/1993 | Wu | 395/200 |
| 5,276,872 | 1/1994 | Lomet et al. | 395/600 |
| 5,561,797 | 10/1996 | Gilles et al. | 395/600 |
| 5,594,900 | 1/1997 | Cohn et al. | 707/204 |
| 5,602,936 | 2/1997 | Green et al. | 382/104 |
| 5,644,698 | 7/1997 | Cannon | 395/182.04 |
| 5,673,382 | 9/1997 | Cannon et al. | 395/182.04 |
| 5,675,725 | 10/1997 | Malcom | 395/182.04 |
| 5,687,367 | 11/1997 | Dockter et al. | 707/102 |

OTHER PUBLICATIONS

Mosse et al. "Analysis of a Fault–Tolerance Multiprocessor Scheduling Algorithm", pp. 16–25, IEEE, Jan. 1994.

King et al, Grervicus of disaster recovery for transation processing systems, pp. 286–293, IEEE, Jul. 1990.

*Primary Examiner*—Thomas G. Black
*Assistant Examiner*—Jean M. Corrielus
*Attorney, Agent, or Firm*—Maureen Stretch

[57] ABSTRACT

A method and apparatus for automatic discovery of databases that determines what databases are installed at a client site, interrogates each database to determine what files or tables are present and what storage is associated with each, groups the databases into the smallest atomic units that can be backed up while preserving database integrity, and presents this information to backup procedures. In a preferred embodiment, a discovery process is performed by a script for each client to be backed up. Each script causes the creation of a temporary file describing each database. The temporary files are normalized into a common format which is then passed to a grouper program that analyzes the temporary files and produces a data descriptor file describing the smallest atomic units that can be backed up while still preserving database integrity at that client site. This data descriptor file is presented to a work item generator for scheduling backup procedures. Backups of each atomic unit can then be scheduled as desired.

6 Claims, 14 Drawing Sheets

*Fig. 1d*

| database_name | storage_device | group |
|---|---|---|
| DBA | S1 | 1 |
| DBA | S2 | 1 |
| DBA | S3 | 1 |
| DBB | S4 | 2 |
| DBB | S5 | 2 |
| DBC | S6 | 3 |
| DBC | S7 | 3 |
| DBD | S7 | 3 |
| DBD | S7 | 3 |

Fig. 6

| Database | Environment variable which must be set |
|---|---|
| Informix | INFORMIX_DIR |
| Oracle | ORACLE_HOME |
| Sybase | SYBASE |

| | | | | |
|---|---|---|---|---|
| J,4, | <subtype>, | <platform code>, | <len>, | <database name>, |
| <dbtype>, | <len>, | <database server name>, | | |
| <len>, | | | | |
| <dbrev>, | <dbflags>, | | | |
| <len>, | <composite name>, | | | |
| <count_of_databases>, | {<len>,<database name>, | | | |
| <count_of_files>, | [<len,<file name>,] | | | |
| <count_of_partitions>, | [<len>, <partition name>,] | | | |
| <number of comments>, | {<len>,<comment string>], | | | |

*Fig. 7b*

```
J,4,1,1,5,cname,5,sname,3,5,dbrev,0x3,4,8,cent2_db,7,cent_db, \
4,rob1,4,rob2,2,19,/SYBASE/Ldrive3.log,20,/SYBASE/Ldrive15.log,2, \
18,/dev/rdsk/c201d2s0,18,/dev/rdsk/c201d4s0,0;
```

Which translates to:

```
Pcode       : 1           /* Platform code
Client      : cname       /* Client name
Server      : sname       /* Server name
Dbase type  : 3           /* Database type code num
Dbase rev   : dbrev       /* Database revision
Dbase flag  : 0x0000      /* Database info flags
Num databii: 4            /* Num dbases in group
Databii:                  /* Names of databases
   cent2_db
   cent_db
   rob1
   rob2
Num files: 2              /* Num files used to backup
   /SYBASE/Ldrive3.log    /* data, followed by file
   /SYBASE/Ldrive15.log   /* names.
Num devices: 2            /* Num physical devices
   /dev/rdsk/c201d2s0     /* used for backup, followed
   /dev/rdsk/c201d4s0     /* by device names
```

*Fig. 9*

| Database | Dbase Password(s) required | File/Directory Access Requires |
|---|---|---|
| Informix | | |
| Oracle | Userid, password capable of reading v$logfile, v$datafile and v$controlfile views. | /etc/oratab |
| Sybase | "sa" userid, password, or userid/password of acct. w/sa priv | $SYBASE/install |

Fig. 10a

```
sqldba
connect sys/sys_password;
create user ebadmin identified by password;
grant select on v_$logfile to ebadmin ;
grant select on v_$datafile to ebadmin;
grant select on v_$controlfile to ebadmin;
grant create session to ebadmin;
```

Fig. 10b

```
isql -Usa -Psa_password
sp_addlogin ebadmin,password,master
go
sp_adduser ebadmin,ebadmin
go
grant select on sysdevices to ebadmin
go
grant select on sysusages to ebadmin
go
grant select on sysdatabases to ebadmin
go
```

METHOD AND APPARATUS FOR AUTOMATIC DISCOVERY OF DATABASES

BACKGROUND OF THE INVENTION

1. Field of the Invention

The invention relates generally to the field of backup and recovery of databases and more particularly to the automatic discovery of databases on storage devices so that they can be grouped for backup purposes.

2. Background

Companies and institutions that use databases in their computer systems often have several of them, some of which may be created and managed by software from different vendors. For example, a large multinational manufacturing company may have at one client site a relational database for handling its manufacturing and inventory data. That company's sales department might use a separate relational database for tracking sales and accounts at that same client site. The company's finance department might use still another relational database to track assets and finances at that client site. It is possible that these databases will be stored on the same storage systems at the client site, which can, in turn, be accessed by the same servers or mainframe computers.

In the example given, the inventory data base may be created and managed by software supplied by Oracle™ Corporation, while the sales database may be created and managed by software from Informix™ Corporation or Sybase™ Corporation, or another supplier of relational databases. While such a mixing of software from different vendors is not the most common usage, it does occur with some frequency.

Since most of these databases hold critical information, regular and reliable backups are important. In addition to backups done for each database, most systems administrators consider it prudent to have disaster recovery backups available as well.

Heretofore, systems or database administrators who wished to perform the backups of such databases had to determine what storage units were used by which databases, which type of database used each, and how the different database systems allocated data to the storage units.

Such an effort is complicated by the fact that one of the most common types of database is a relational database and each relational data base has a number of files or tables created for it by the database application program. One Oracle™ relational database, for example, may have control files, data files, online redo log files, archive redo log files, initialization parameter files, and a file containing the Oracle™ code, among other files. Traditional backup planning requires that the system or database administrator know where each of these files for a given database is located on the storage units available to the system or server. FIG. 5 illustrates how a Sybase™-like database, for example, DB-C, might allocate indexes C66, catalog tables C64, data tables C70, C72, into two logical groupings, system tables C60 and user database tables C68. In turn, these logical groupings may be physically allocated to two different storage units S6 and S7.

A vendor may supply its own backup and restore programs or offer guidelines for using commonly available operating system software utilities to perform backups and restores. Whether unique programs are supplied or only guidelines, these differ from each other and cannot be used interchangeably. That is, the Informix™ backup and restore procedures usually will not work with a database from Sybase™. Since each database vendor also allocates data to storage units differently, system-wide backup and restore efforts require a significant a level of expertise on the part of the administrator(s).

Space for each database at a client site may be grouped across several storage devices, as shown in FIG. 2. If two databases from different vendors are allocated to the same storage unit at one client site, and that unit is backed up, all the databases that have any files on that device must be completely restored to preserve database integrity. To illustrate, suppose database DB-C of FIG. 2 is allocated across storage units S6 and S7 and database DB-D is allocated across units S7 and S8. Databases DB-C and DB-D share a storage unit S7. Assume a backup copy is made of storage of units S6, and S7 for database DB-C, using an operating system-level utility. After the backup copy is made, database DB-D is updated by many transactions, but database DB-C remains as it was. If a failure occurs and the backup copy is restored to units S6 and S7, database DB-C is operational again, but database DB-D may be corrupted. This problem can occur even if both databases DB-C and DB-D use the same vendor software.

If a given installation attempts to eliminate the risk of corruption by backing up each database individually, under manual control, using the procedures or programs designated by the vendor, that, too, can be problematic since it is slow and is prone to manual mistakes.

Consequently, if client site complete backups are done using present methods they are usually done either by writing all storage units to backup devices at one time, which restricts scheduling flexibility and requires that all units be restored at the same time, as well, or by requiring that each individual database be backed up by an expert administrator using the tools or system procedures supplied for use with only that database.

It is an object of the present invention to provide a way to discover and backup databases that is more convenient for the user than present methods.

Yet another object of the present invention is providing a method and apparatus to discover and backup databases that requires less user level expertise than present methods.

Still another object of the present invention is providing a method and apparatus to discover and backup databases that is less error prone than a primarily manual process.

SUMMARY OF THE INVENTION

These and other objects of the invention are achieved by a method and apparatus for automatic discovery of databases that determines what databases are installed at a client site, interrogates each database to determine what files or tables are present and what storage is associated with each, groups the databases into the smallest atomic units that can be backed up while preserving database integrity, and presents this information to backup procedures. In a preferred embodiment, a discovery process is performed by a script for each client to be backed up. Each script causes the creation of a temporary file describing each database. The temporary files are normalized into a common format which is then passed to a grouper program that analyzes the temporary files and produces a data descriptor file describing the smallest atomic units that can be backed up while still preserving database integrity at that client site. This data descriptor file is presented to a work item generator for scheduling backup procedures. Backups of each atomic unit can then be scheduled as desired.

It is an aspect of the present invention that it performs automatic discovery of databases.

Another aspect of the present invention is that it provides additional scheduling flexibility to the backup and restore of databases without compromising data integrity.

It is a feature of the present invention that by grouping databases into atomic units the invention reduces the likelihood of compromising data integrity.

Yet another feature of the present invention is that it reduces the likelihood of errors arising through manual procedures.

Still another aspect of the present invention is that it is simple to use in connection with databases supplied by different vendors.

BRIEF DESCRIPTION OF THE DRAWINGS

FIG. 1*d* is a table illustrative of the results of the grouper program according to the method and apparatus of the present invention.

FIG. 6 is a table of environment variables that must be set according to the method and apparatus of the present invention in a preferred embodiment.

FIG. 7 is a block diagram of an database descriptor file according to a preferred embodiment of the present invention.

FIG. 7*b* is a partial list of field definitions in a database descriptor file according to a preferred embodiment of the present invention.

FIG. 9 is a table showing items of information required by various database vendors for access.

FIG. 10*a* is a listing of a partial discovery script for an Oracle™ database according to the method and apparatus of the present invention.

FIG. 10*b* is a listing of a partial discovery script for an Informix™ database according to the method and apparatus of the present invention.

DETAILED DESCRIPTION OF THE INVENTION

Figure 1A:
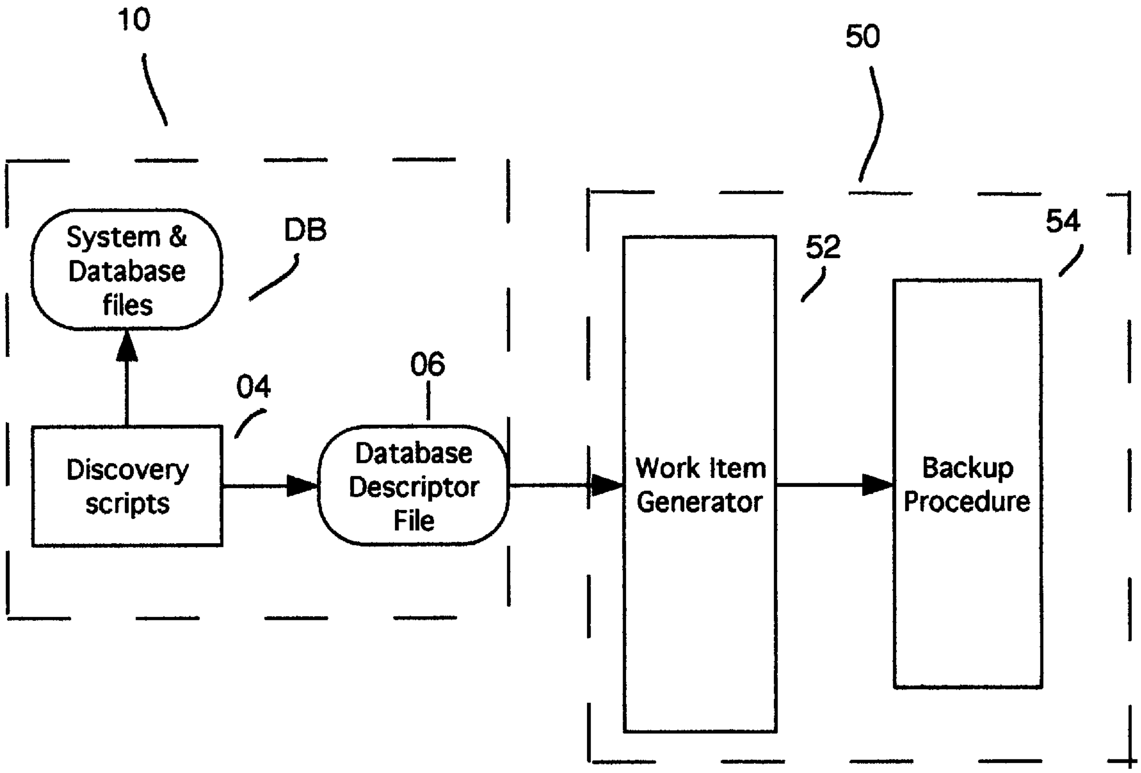
FIG. 1*a* is a block diagram of the present invention.

In FIG. 1, a schematic flow diagram of the present invention is shown. In a preferred embodiment, the invention operates on one or more clients 10, containing a number of system and database files DB. Discovery scripts are performed on client 10 to create a database descriptor file 06 describing the smallest atomic units of system and database files that can be backed up without compromising data integrity. Database descriptor file 06, in turn, can be accessed by a work item generator 52, operating on a storage management server 50 that is in communication with client 10. Work item generator 52 communicates with the backup procedures 54 used by the server to backup the system and database atomic units listed in database descriptor file 06.

Figure 2:
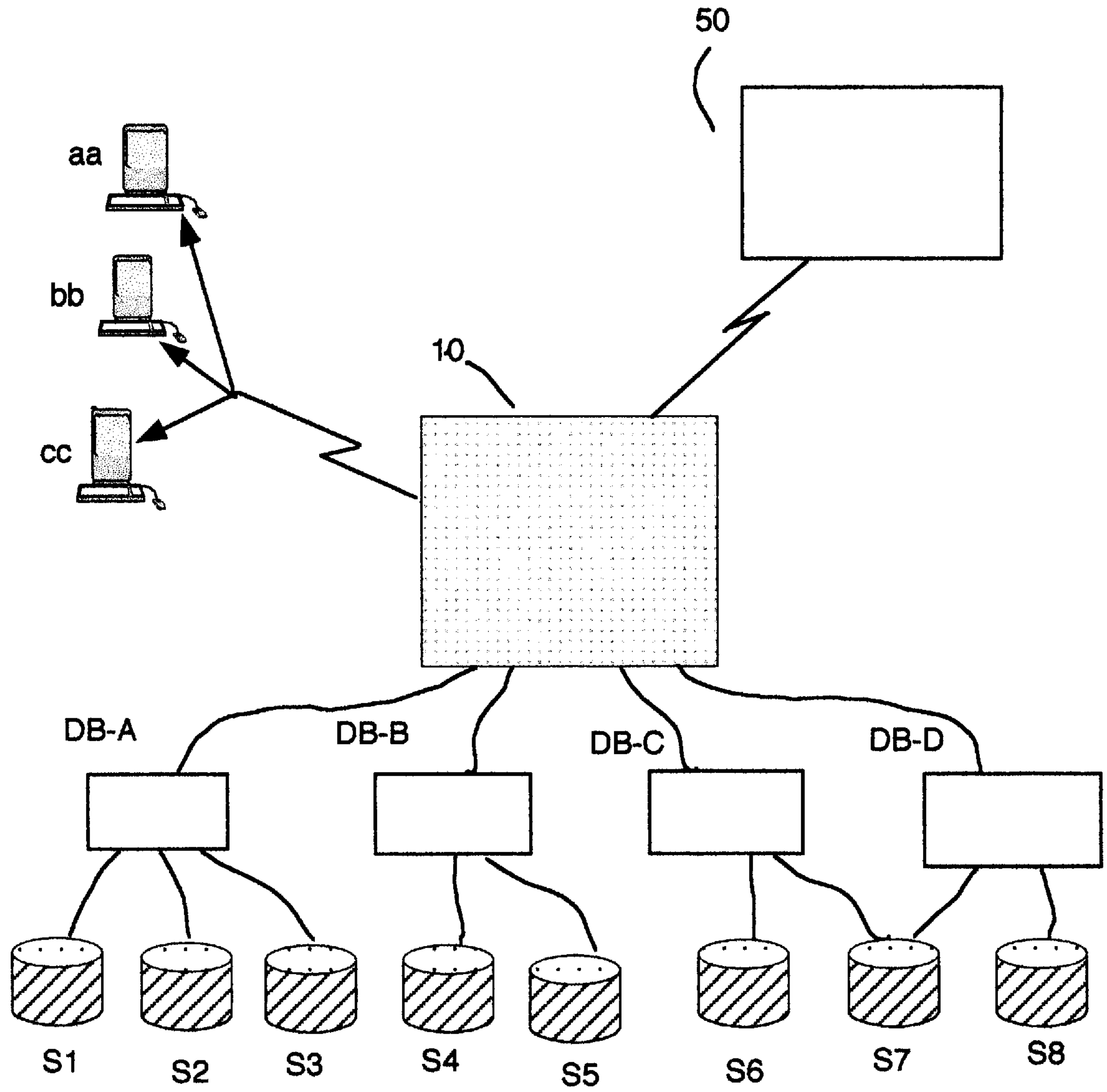
FIG. 2 is a schematic diagram of databases allocated to storage units on a client accessed by a server.

In FIG. 2, an example of system and database files DB is shown. It can be seen that storage management server 50 is in communication, either through local connection or over a network, with client 10. Client 10, in turn, acts as a database server to personal computers aa, bb and cc in a network. In a preferred embodiment, storage management server 50 is usually a mainframe computer or powerful workstation computer running a storage management system, such as EMC Corporation's Epoch Database Management System. Depending on the user's installation, client 10 could be a workstation computer, a mainframe computer, a minicomputer or a personal computer. As will be apparent to those skilled in the art, client 10 and storage management server 50 could also be the same computer, in which case the client/server analogy is less apt.

Still in FIG. 2, at client 10, there are four databases DB: DB-A, DB-B, DB-C and DB-D. Each database is allocated to specific storage devices by the vendor-supplied program that created the database, such as programs from Oracle™, Informix™, Sybase™, etc.

Database DB-A, for example, is allocated to space on three storage units S: S1, S2, and S3. Database DB-B has been allocated to two more storage units S: S4 and S5. Database DB-C has been allocated to storage units S6 and S7. Note that the fourth database, DB-D, in this example, has been allocated to storage units S7 and S8. In this example, databases DB-C and DB-D share storage unit S7.

Most general purpose backup programs operate most efficiently by copying all the data on one or more designated storage units to some backup medium, such as tape or another storage device. Thus, a normal backup of database DB-C would copy storage units S6 and S7 in their entirety to the backup media. If this media is used to restore database DB-C a day after the backup has been made, storage units S6 and S7 will be returned to the state they were in when the backup was made. Any changes that have been made to DB-D on S7 during that one-day interval will be lost. In addition, it is possible that this kind of backup and restore may cause corruption in the system and other files of database DB-D.

Thus, in the example shown in FIG. 2, neither database DB-C nor database DB-D can be backed up by itself without causing potential corruption problems for the other database. Therefore, the smallest atomic units that can be backed up as single entities in the examples shown in FIG. 2 are database DB-A, database DB-B, and the combination of databases DB-C and DB-D together.

Figure 3A:
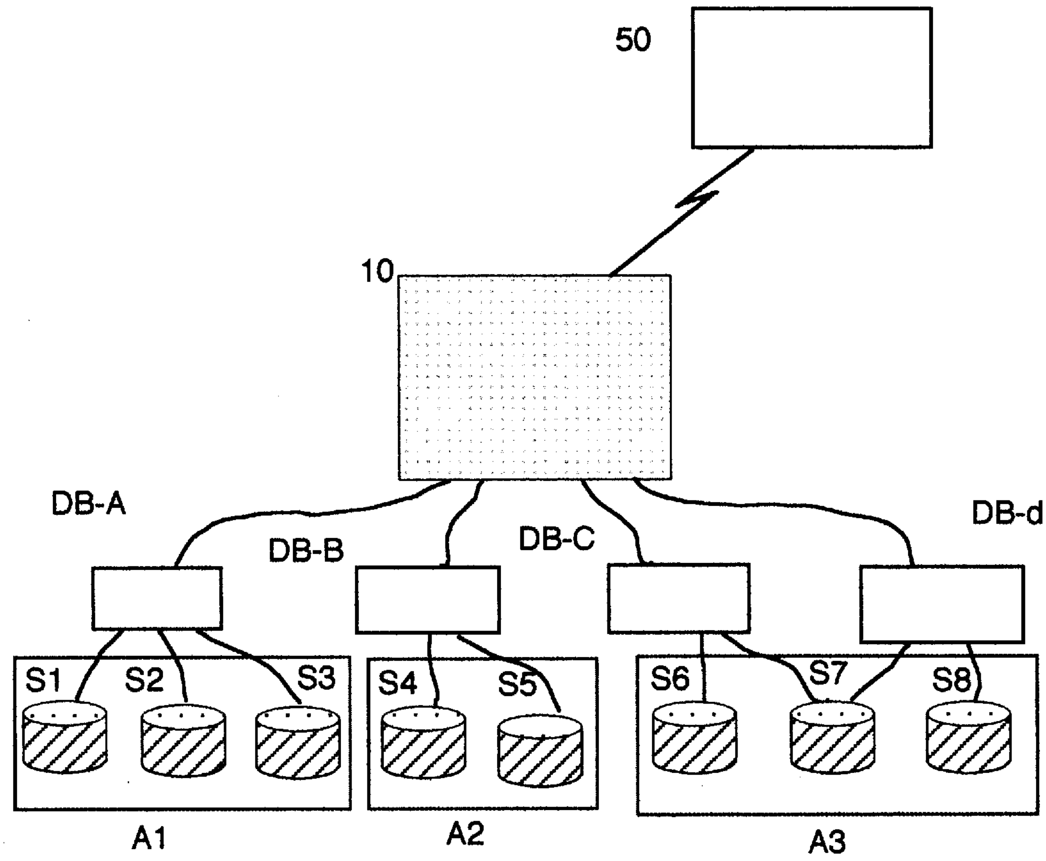
FIG. 3*a* is schematic diagram of a grouping of databases according to the method and apparatus of the present invention into atomic units.
Figure 3B:
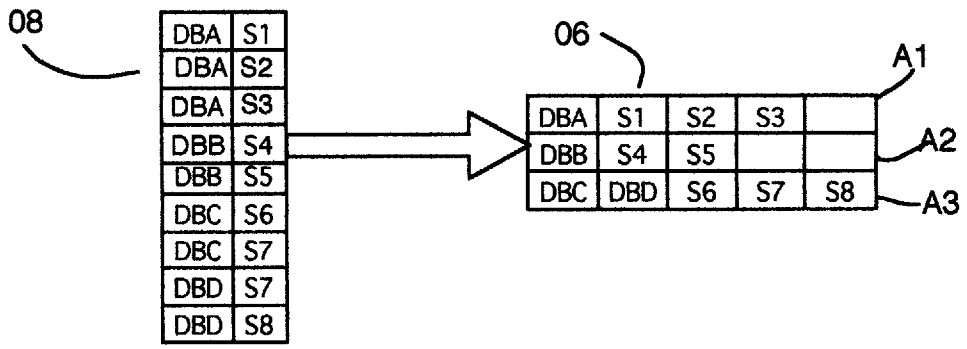
FIG. 3*b* is set of tables illustrating the grouping of databases according to the method and apparatus of the present invention into atomic units.

This is shown more clearly in FIGS. 3*a* and 3*b*. In FIG. 3*a* storage management server 50 and client 10 are shown again having the same database configuration as that depicted in FIG. 2. However, in FIG. 3*a*, the smallest atomic units A, that can be backed up individually are shown as A1, A2 and A3. Atomic unit A1 contains only database DB-A, since no other databases share any of the storage units S1, S2 or S3 allocated to it. The same is true for database DB-B. It is atomic unit A2, since no other database is allocated to the units used by it. However, databases DB-C and DB-D, together, comprise atomic unit A3, because they do share storage unit S7. Since they share this unit, any general level backup or restore of the entire unit affects both databases.

Referring now to FIG. 3*b*, the overall logic of the grouping of databases into atomic units is shown. Data table 08 is a schematic representation of a normalized temporary file created by using scripts to identify which databases are present on client 10 and the storage units Sn, where n is the identity of a unit, to which they are allocated.

Figure 1B:
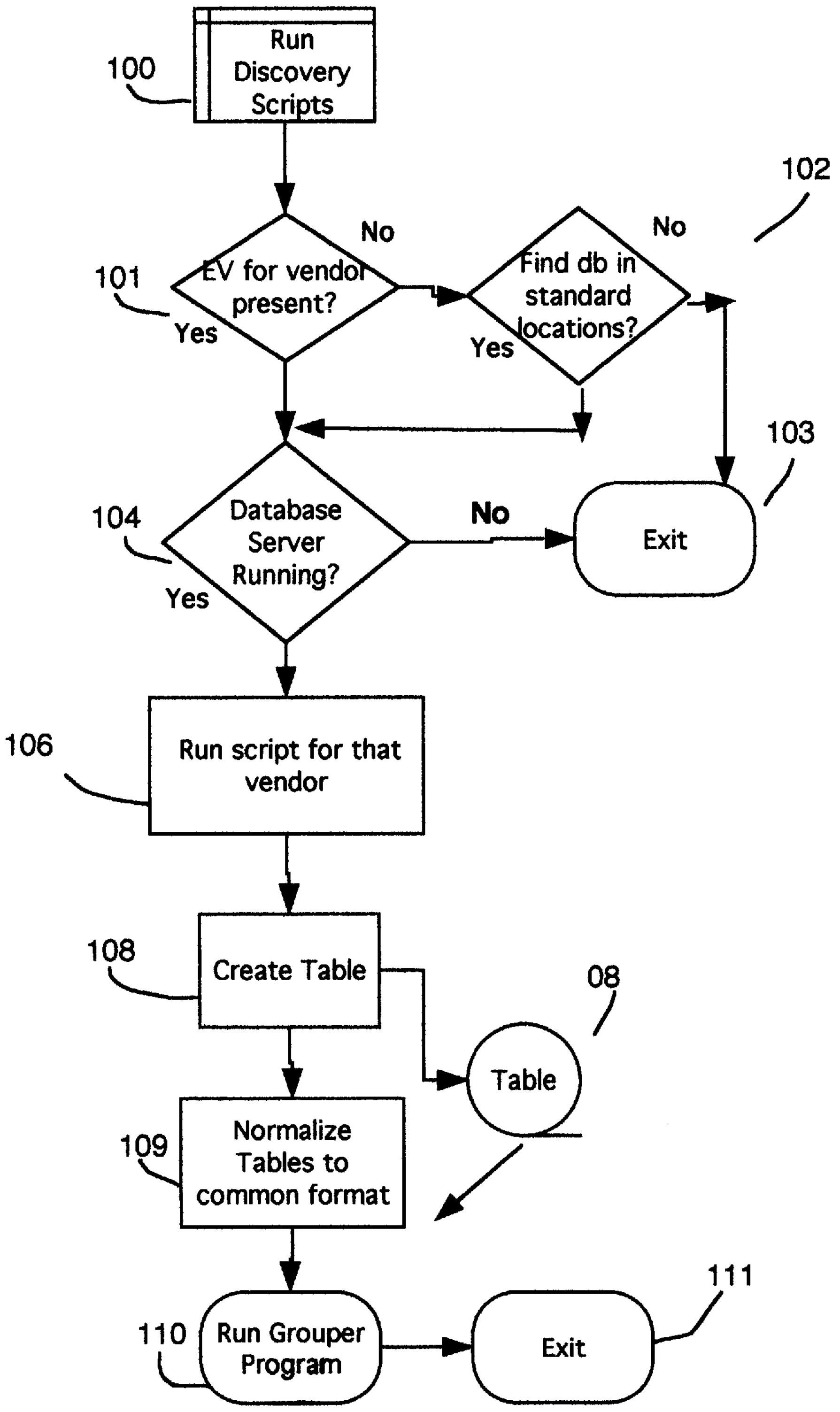
FIG. 1*b* is a flow diagram of the discovery process of the present invention.

Referring now to FIG. 1*b*, the overall logic of the present invention is shown. In a preferred embodiment, the database server program must be running on client 10. A script is run to create a temporary file. In a preferred embodiment, a grouper program can then be executed to analyze table 08 and produce database descriptor file 06, which lists the atomic units contained in table 08. As shown in more detail in FIG. 1*b*, at step 100, a particular type of database is selected by looking for its environment variable in operating system directories. In a preferred embodiment, the Unix operating system is used, but as will be apparent to those skilled in the art, any of a number of operating systems which permit the user of scripts or stored command sequences can be used.

If the environment variable for a specific vendor is present in the system directories of the operating system running on client 10, an attempt to run the script on that vendor's server on client 10 is made at step 104. If the server is running, the script will execute. If the server is not running, no discovery is performed, in a preferred embodiment.

If the server is running, the script for that vendor is executed at step 106. For relational databases, the script is an SQL script which that vendor's software will execute to create a temporary file indicating where all the files are located. For other types of databases, either a script or an executable program or utility can be run to locate the database and create the temporary file.

Once a temporary file has been created for one data base, steps 104 through 108 are executed for each database vendor software type identified in the system environment variables. If 6 databases exist, 3 created by Oracle™, 1 by Sybase™ and 2 by Informix™, then 3 temporary files will be created, one for each vendor. Next, at step 109, these three files, which, in a preferred embodiment, are in ASCII format produced by the various database vendors, are normalized by a Unix or shell script that takes the three ASCII files in, and creates one output ASCII temporary file that is in uniform format. That file is generally in the format illustrated in data table 08 in FIG. 3*b*. That file becomes the input to a grouper program according to the method and apparatus of the present invention at step 110.

Figure 1C:
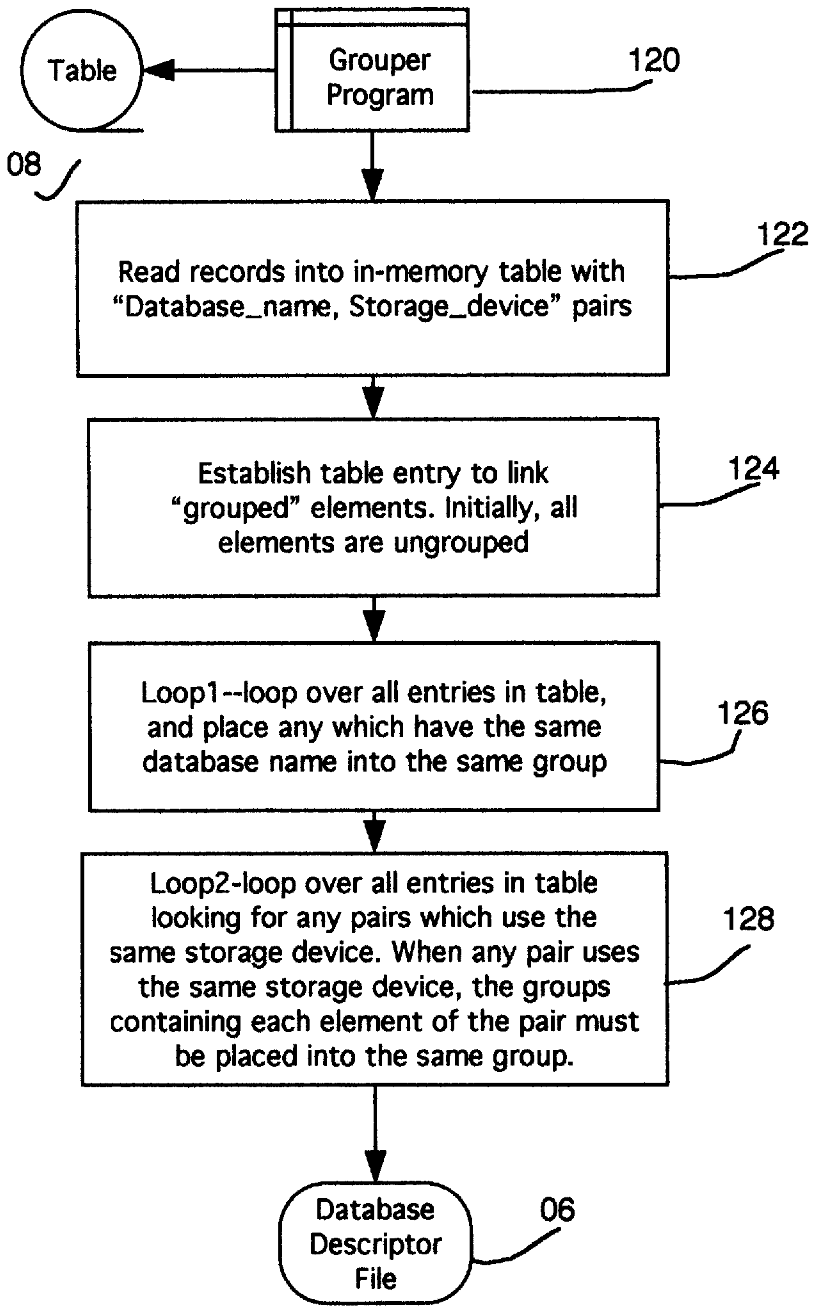
FIG. 1*c* is a flow diagram of a grouper program according to the method and apparatus of the present invention.

Turning now to FIG. 1*c*, a flow diagram of a grouper program according to the method and apparatus of the present invention is presented. At entry to grouper program 120, table 08 is provided as input. At step 122, grouper program 120, reads records from table 08 into an in-memory table with columns named "Database_name and "Storage_device" as shown in FIG. 1*d*. At step 124, a table entry named group is established to link "grouped" elements. Initially, all the elements are ungrouped. Next, at step 126, a first loop is performed, iterating over all entries in the table and placing any which have the same database_name into the same group. Still in FIG. 1*c*, next, at step 128, a second loop iterates over all entries in the table looking for any pairs which use the same storage device. When any pair uses the same storage device, the groups containing each element of the pair must be placed into the same group.

When steps 126 and 128 are completed the result is the database descriptor file 06, which is then written to storage in a preferred embodiment. As will be apparent to those skilled in the art, however, it could also be sent as a message or communication file to work item generator 52.

Now with reference to FIG. 6, a data descriptor file 06 is shown in block diagram form. In a preferred embodiment, the file layout is compatible with EMC Corporations Epoch Storage Management System file formats, and in particular the format known as J,4. As will be apparent to those skilled in the art, any of a number of flat file formats, keyword formats, or other formats can be used to convey the information produced by the grouper program to a suitable backup scheduling program or backup program.

In the format shown in FIG. 7*a* and 7*b*, the J,4 record descriptor appears first in the file. This is followed by a subtype field which is a reserved, unused field in a preferred embodiment. Next, a platform code field can be used to identify the machine type the discovery code runs on, if more than one type of computer is used. Next a database name appears. For each atomic unit An, a J,4 type record is created.

Returning to FIG. 1*a*, once a database descriptor file 06 describing the atomic units found in system and database files DB is created, it can be sent or accessed by a work item generator 52 running as part of an overall storage management system on storage management server 50. In a preferred embodiment, this is EMC Corporation's Epoch Storage management system. In that system, a program known as a work item generator reads files to determine what work is to be scheduled for the backup and recovery programs of the storage management system. Work item generator 52 is then able to schedule backups for the various atomic units An, and convey that information to the backup procedure 54. This provides a significant level of flexibility to the installations represented by storage management server 50 and client 10. Rather than require system administrators to become expert in each different vendor database in order to schedule and execute regular backups of them, the discovery scripts 04 collect the information about the system and database files DB for analysis by the grouper program to generate database descriptor file 06. In turn, work item generator 52 at the storage management server 50, can then schedule backups for each atomic unit An, identified in descriptor file 06. The schedules selected can be defined and customized for each client/server to optimize efficiencies.

Figure 4:
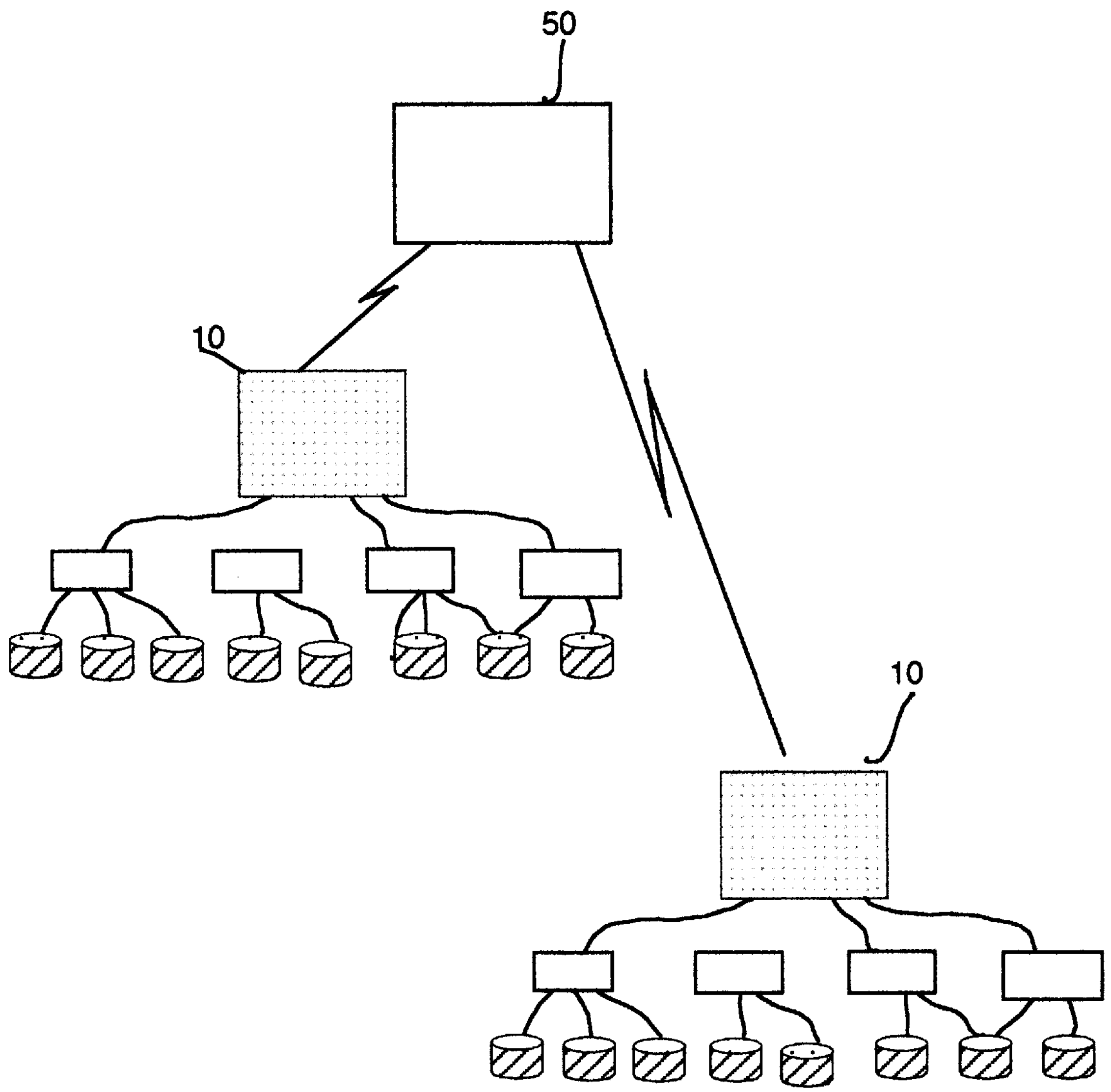
FIG. 4 is a schematic diagram of several database clients accessed by a server.

Now turning to FIG. 4, it can be seen that several clients 10 may be managed in this way by the storage management processes on storage management server 50. In the past, as this type of expansion occurred, without the present invention, more training and expertise needed to be developed in the organization to manage this. The present invention makes it easier to accommodate and manage this kind of growth.

In the same way, in the past, if one wanted to have full unit backups made regularly of all databases, the most prudent method would have been to shut down or quiesce all systems and activities while the backups were done all at one time. According to the method and apparatus of the present invention, the benefit of regular full backups can be obtained without shutting down all systems and activities. Instead, backups can be scheduled by storage management server 50 to occur in an orderly fashion for the various atomic units An spread throughout each client 10. Shutdown or quiescing of the database server for a particular database vendor on a client 10 need only be done when an atomic unit An is being backed up. In some cases, only the instance of that database needs to be quiesced on that server.

Figure 5:
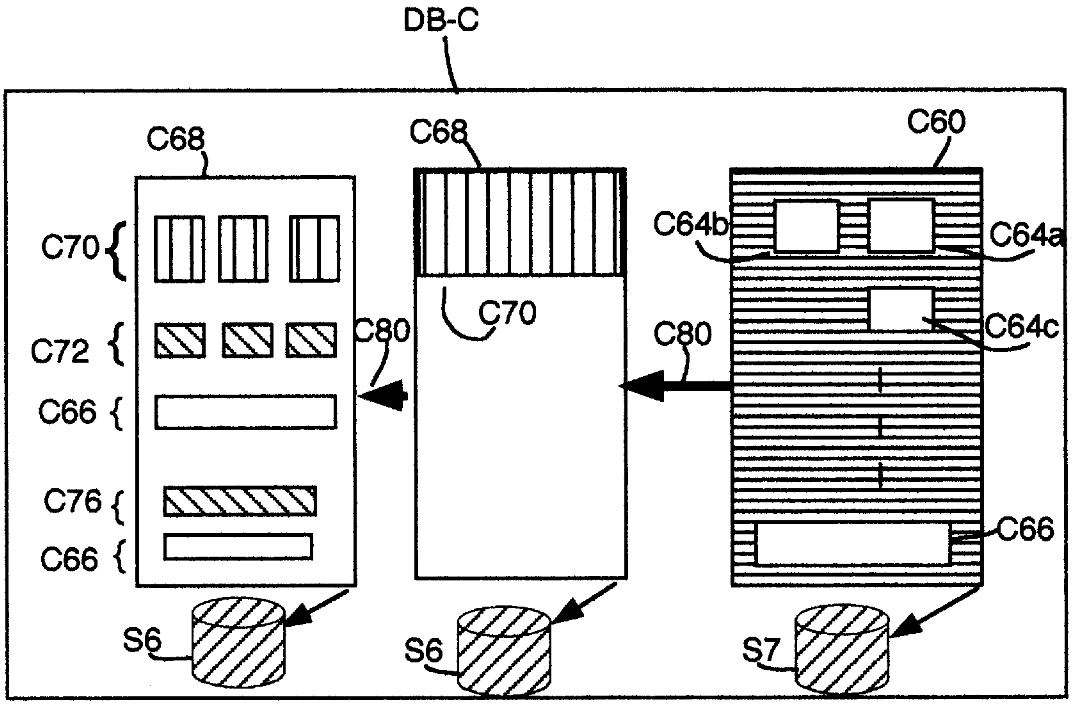
FIG. 5 is a schematic diagram of relational database tables and files as they might be allocated to storage units.
Figure 5:
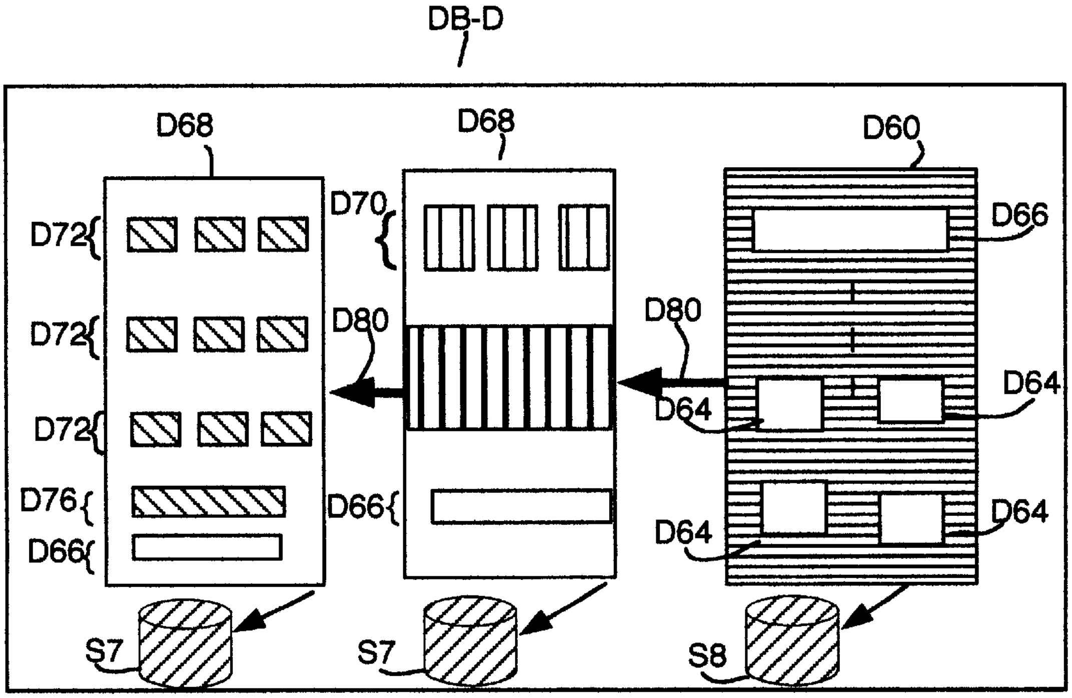

As mentioned earlier, the complexity of individual relational databases is illustrated in FIG. 5. The two different relational databases DB-C and DB-D shown earlier in FIG. 3 are schematically depicted in FIG. 5 in more detail, both as they might be structured logically and as they might be physically allocated to storage. Database DB-C, for example, has a system table C60, that contains an index C66, and several catalog tables C64*a–c*. This system table C60 is shown as physically allocated to storage unit S7. Addresses and other connectors C80 logically connect the system table C60 to user data C68. Each collection of user data C68, in turn may have a number of data tables C70 and C72, and C76 as well as indexes C66. In this example, user data C68 is shown allocated to storage unit S6 for database DB-C.

In the same FIG. 5, a second database, DB-D is shown, also having system tables D60, and user data D68. In this database DB-D, the location and the number of catalog tables D64, as well as data tables D72, D70 and D76 are different, as would be their contents. In this example, user data D68 for database DB-D is physically allocated to storage unit S7, while system tables D60 are allocated to storage unit S8.

The database management programs that create and manage such tables and structures as those shown in FIG. 5 vary in the way they organize the tables and files both logically and physically. The present invention backs up all the storage units associated with an atomic unit, going directly to the device or "raw" file, as it is sometimes called, itself, thus bypassing the database access in order to gain speed.

Different vendors also have different access requirements for databases created by their respective programs. For example, as shown in FIG. 9, databases created by the Oracle™ database management program require a Userid and password that is designated as having the right to access such things as the Oracle™ v$logfile, v$datafile and v$controlfile views of the databases. (Most relational databases permit users to create "views" of the data. Views may sometimes be called virtual tables or derived tables.)

Still in FIG. 5, when a particular vendor's database program is installed on a computer system such as client 10, various directories and files are created on the main directories of the operating system software that is executing on client 10. In a preferred embodiment, it is assumed that a version of the Unix operating system is running on the cpu in client 10. Thus, when database software is installed, the main directories of the operating system on client 10 are updated to include references to this installation.

As indicated in FIG. 6, if the Informix™ database software has been installed on the client 10, there will be an environment variable (EV) Vn,, present such as directory entry V1, indicating that Informix™ is installed. Similarly, for Oracle™, and Oracle™_Home entry V2 will exist. And for Sybase™, a directory entry V3 will be found. In a preferred embodiment, discovery scripts DS1, always check for an environment variable to see if the database is installed. If the environment variable is not set, the present invention will look for the database in some standard locations. For example, it will look for an "oratab" file in the system area for Oracle™ databases, or look for an Informix™ account password file, for Informix™ databases, or for Sybase™ databases, it will look for a /SYBASE™ directory or link. These kinds of indicators of the existence of a database are usually known for each type of database vendor and operating system environment.

Figure 8:
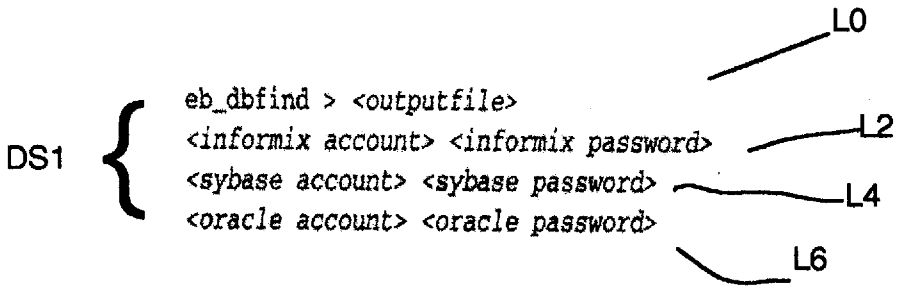
FIG. 8 is a schematic diagram of a script for the automatic discovery process of the present invention.

FIG. 8 shows a discovery script DS1 used according to the method and apparatus of the present invention. In a preferred embodiment, a line is created in a discovery script for each database vendor, such as the discovery script DS1 shown in FIG. 8. There, line L0 of discovery script DS1, refers to a set of discovery scripts called dbfind, which will create a data descriptor file 06, called <outputfile> in this example. Assuming databases from three vendors, Informix™, Sybase™ and Oracle™ are present on client 10, a system administration account has usually been created for each, by a system administrator or database administrator, having system-wide access privileges associated with its password.

When the system administration account is created, the appropriate environment variables are also associated with each vendor. Returning to FIG. 8, line L1 of DS1 names the Informix™ system administration account name and uses the system password for it, line L2 identifies the Sybase™ system administration account name and password, and line L3 names the Oracle™ system administration account and password. Thus, dbfind is a script which causes discovery scripts to be run, in this example, for each of the 3 database types. The discovery scripts are usually a combination of Unix or Unix-shell scripts and database SQL scripts. The shell scripts locate information stored in operating system files and directories, while the SQL scripts are run by the database server itself and locate information known to the vendor-specific software. As will be apparent to those skilled in the art, these scripts could also be executable programs, but using shell scripts and SQL scripts provides simpler editing and maintenance in a preferred embodiment.

In a preferred embodiment, the use of a system administration account and an associated password as shown in FIG. 8 provides the simplest way to set up a discovery script DS1. As will be apparent to those skilled in the art, this approach while very broad in scope, has the drawback of giving very broad privileged access to the account. If there are several clients 10 being managed for backup purposes by one storage management server 50, the users at one or more of the clients 10 may not want anyone to have such broad access.

In an alternative preferred embodiment, then, minimally privileged accounts are created for each vendor at a client site. In these cases, Structured Query Language (SQL) scripts such as those depicted in FIGS. 10*a* and 10*b* are used. FIG. 10*a* shows the script used for an Oracle™ database, FIG. 10*b* shows the one used for a Sybase™ database.

As will be apparent to those skilled in the art, rather than using scripts, an executable program could be written to perform the same functions. However, the use of scripts allows the invention to run on all standard Unix platforms supported by the vendors. An executable would probably have to be recompiled for each platform.

As will be apparent to those skilled in the art, while the examples shown are directed primarily to relational databases, the invention can be used with other types of databases provided that information about their allocations to storage units can be ascertained through some means that can be automated, such as scripts, command sequences, utilities or special purpose programs, among others.

Preferred embodiments of the present invention are designed to be run as scripts and programs stored on disks or tapes or other magnetic, optical or digitally readable media and brought into a computer system for execution.

Those skilled in the art will appreciate that the embodiments described above are illustrative only, and that other systems in the spirit of the teachings herein fall within the scope of the invention.

What is claimed is:

1. An apparatus for automatically discovering databases allocated to storage systems, comprising:

a storage management server computer communicating with a database client computer, the storage management server computer having a work item generator and a backup program;

a set of instructions capable of collecting file allocation information from the database client computer into a temporary file;

a grouper program capable of reading the temporary file and analyzing it to identify as atomic units the smallest set of databases that can be backed up as a unit without compromising data integrity; and an output descriptor file for storing the results produced by the grouper program, so that the work item generator can schedule backups for the storage management server computer to execute, thereby providing a database discovery and backup system that does not compromise data integrity.

2. The apparatus of claim 1, wherein the set of instructions further comprises scripts stored in a known location in the storage management server computer.

3. The apparatus of claim 1, wherein the set of instructions further comprises an executable program stored in a known location in the storage management server computer.

4. A method for automatically discovering databases allocated to storage systems, comprising the steps of:

establishing communication between a storage management server computer and a database client computer, the storage management server computer having a work item generator and a backup program;

performing a set of instructions capable of collecting file allocation information from the database client computer into a temporary file;

executing a grouper program capable of reading the temporary file and analyzing it to identify as atomic units the smallest set of databases that can be backed up as a unit without compromising data integrity; and creating an output descriptor file for storing the results produced by the grouper program, so that the work item generator can schedule backups for the storage management server computer to execute, thereby providing a database discovery and backup system that does not compromise data integrity.

5. The method of claim 4, wherein the step of performing a set of instructions further comprises the step of performing scripts stored in a known location in the storage management server computer.

6. The method of claim 4, wherein the step of performing a set of instructions further comprises the step of running an executable program stored in a known location in the storage management server computer.

* * * * *